(12) United States Patent
Turki et al.

(10) Patent No.: US 12,400,100 B2
(45) Date of Patent: Aug. 26, 2025

(54) ON-METAL RFID TAG

(71) Applicant: HID Global Corp., Austin, TX (US)

(72) Inventors: Badredin Mohamed Turki, Farnham (GB); Charles Vilner, Crawley (GB)

(73) Assignee: HID Global Corp., Austin, TX (US)

( * ) Notice: Subject to any disclaimer, the term of this patent is extended or adjusted under 35 U.S.C. 154(b) by 0 days.

(21) Appl. No.: 18/511,345

(22) Filed: Nov. 16, 2023

(65) Prior Publication Data

US 2024/0169178 A1    May 23, 2024

Related U.S. Application Data

(60) Provisional application No. 63/384,105, filed on Nov. 17, 2022.

(51) Int. Cl.
  *G06K 19/077* (2006.01)

(52) U.S. Cl.
  CPC . *G06K 19/07749* (2013.01); *G06K 19/07722* (2013.01)

(58) Field of Classification Search
  CPC ............... G06K 19/07749; G06K 19/07722
  USPC ........................................................ 235/492
  See application file for complete search history.

(56) References Cited

U.S. PATENT DOCUMENTS

| | | | |
|---|---|---|---|
| 8,299,927 B2 | 10/2012 | Lawrence et al. | |
| 8,794,533 B2 | 8/2014 | Cote et al. | |
| 9,104,952 B2 | 8/2015 | Lawrence et al. | |
| 9,590,306 B2 | 3/2017 | Brown et al. | |
| 10,846,585 B1 * | 11/2020 | Keller | G06K 19/07771 |
| 2002/0167450 A1 | 11/2002 | Korden et al. | |
| 2005/0058895 A1 * | 3/2005 | Aamodt | H01M 50/466 429/142 |
| 2006/0125641 A1 | 6/2006 | Forster | |
| 2006/0202835 A1 * | 9/2006 | Thibault | A01K 11/004 340/572.9 |
| 2006/0255945 A1 | 11/2006 | Egbert | |
| 2008/0018428 A1 | 1/2008 | Nakamura et al. | |
| 2008/0018479 A1 | 1/2008 | Hashimoto et al. | |
| 2008/0218344 A1 * | 9/2008 | Lazar | G06K 7/10039 340/572.1 |

(Continued)

FOREIGN PATENT DOCUMENTS

| | | |
|---|---|---|
| DE | 202009012901 | 2/2010 |
| JP | 2009230501 | 10/2009 |
| WO | 2021100576 | 5/2021 |

OTHER PUBLICATIONS

"European Application Serial No. 23210682.3, Extended European Search Report mailed Apr. 3, 2024", 8 pages.

(Continued)

*Primary Examiner* — Allyson N Trail
(74) *Attorney, Agent, or Firm* — Schwegman Lundberg & Woessner, P.A.

(57) ABSTRACT

A radio frequency identification (RFID) tag including a face stock layer, an antenna inlay beneath the face stock layer and comprising a radio frequency (RF) antenna and an integrated circuit (IC) chip, a spacer layer beneath the antenna inlay, and a metal ground plane. The antenna inlay may include a near-field communication (NFC) or high frequency (HF) antenna, and optionally may include an ultra-high frequency (UHF) antenna. The spacer may be made of a flexible polypropylene, and the metal ground plane may be made of aluminum.

16 Claims, 6 Drawing Sheets

(56) References Cited

U.S. PATENT DOCUMENTS

| | | | |
|---|---|---|---|
| 2010/0113118 A1* | 5/2010 | Shigeta | G07F 17/3251 |
| | | | 29/592.1 |
| 2010/0289627 A1* | 11/2010 | McAllister | H04L 9/3226 |
| | | | 340/10.42 |
| 2011/0018689 A1 | 1/2011 | Mcallister et al. | |
| 2011/0068178 A1 | 3/2011 | Gebhart | |
| 2016/0180213 A1* | 6/2016 | Forster | H01Q 21/30 |
| | | | 235/492 |
| 2017/0316299 A1 | 11/2017 | Ritamäki et al. | |
| 2019/0073496 A1* | 3/2019 | Fisher | G06K 7/10336 |
| 2019/0271681 A1* | 9/2019 | McKirdy | G06K 19/0723 |
| 2019/0386390 A1* | 12/2019 | Kawai | G06K 19/07728 |
| 2020/0127364 A1* | 4/2020 | Kramer | H04W 4/023 |
| 2021/0383182 A1* | 12/2021 | Chai | B32B 27/12 |
| 2023/0017472 A1* | 1/2023 | Pantaloni | G06K 19/0773 |
| 2023/0351140 A1* | 11/2023 | Koski | H01Q 1/2225 |

OTHER PUBLICATIONS

"European Application Serial No. 23210682.3, Response filed Nov. 11, 2024 to Extended European Search Report mailed Apr. 3, 2024", 20 pgs.

* cited by examiner

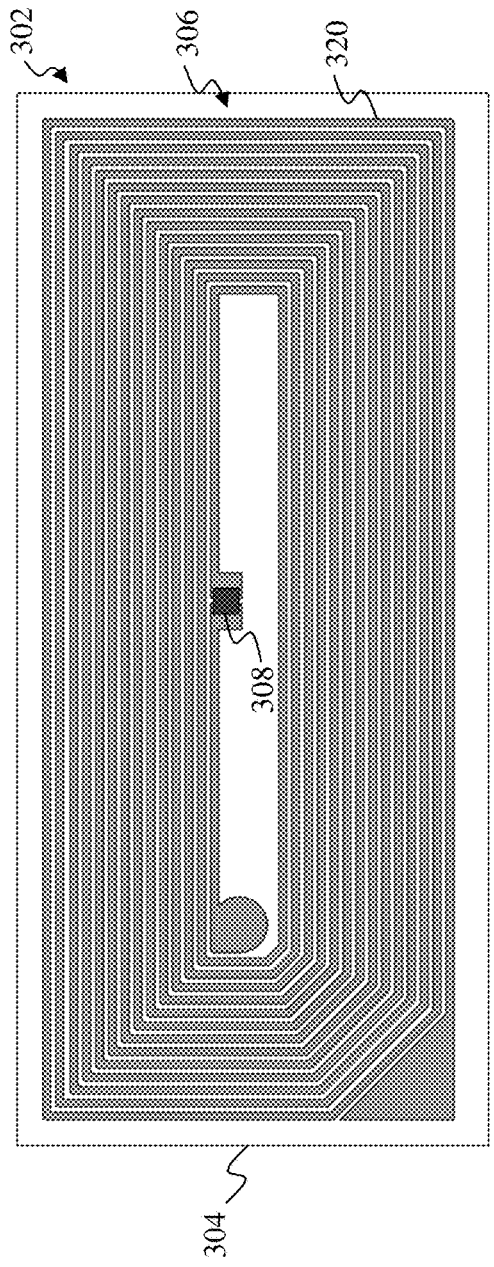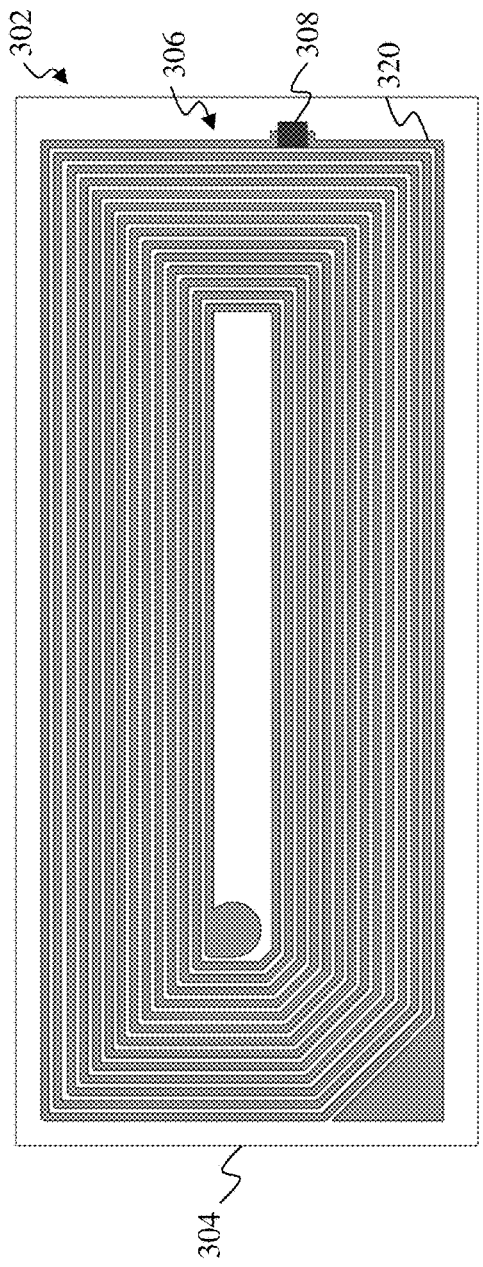
FIG. 3a
FIG. 3b

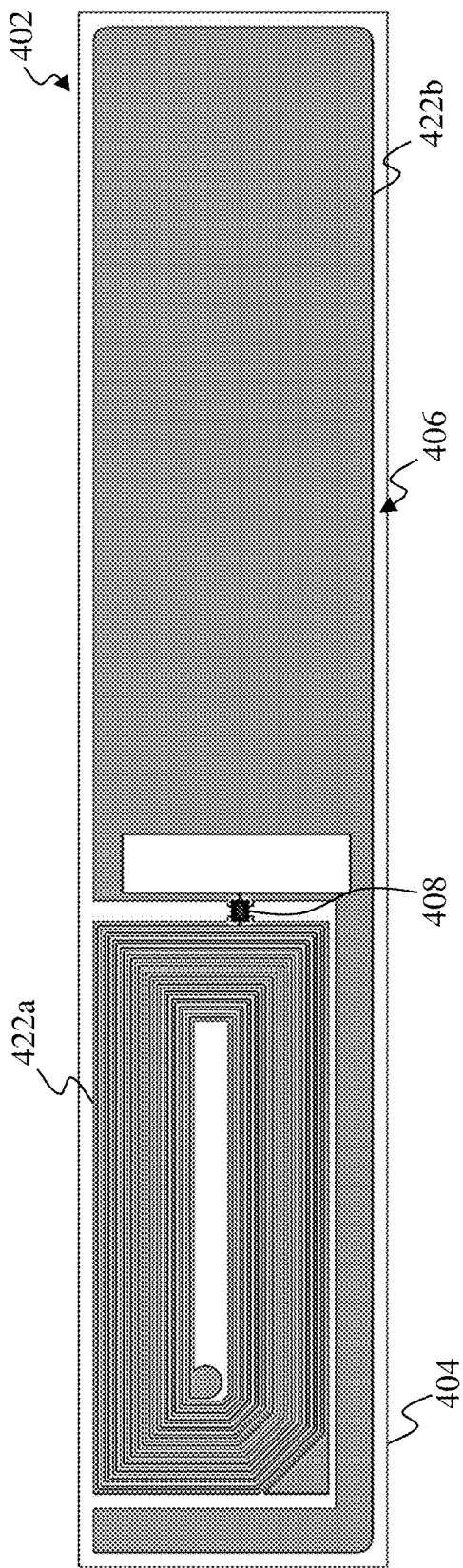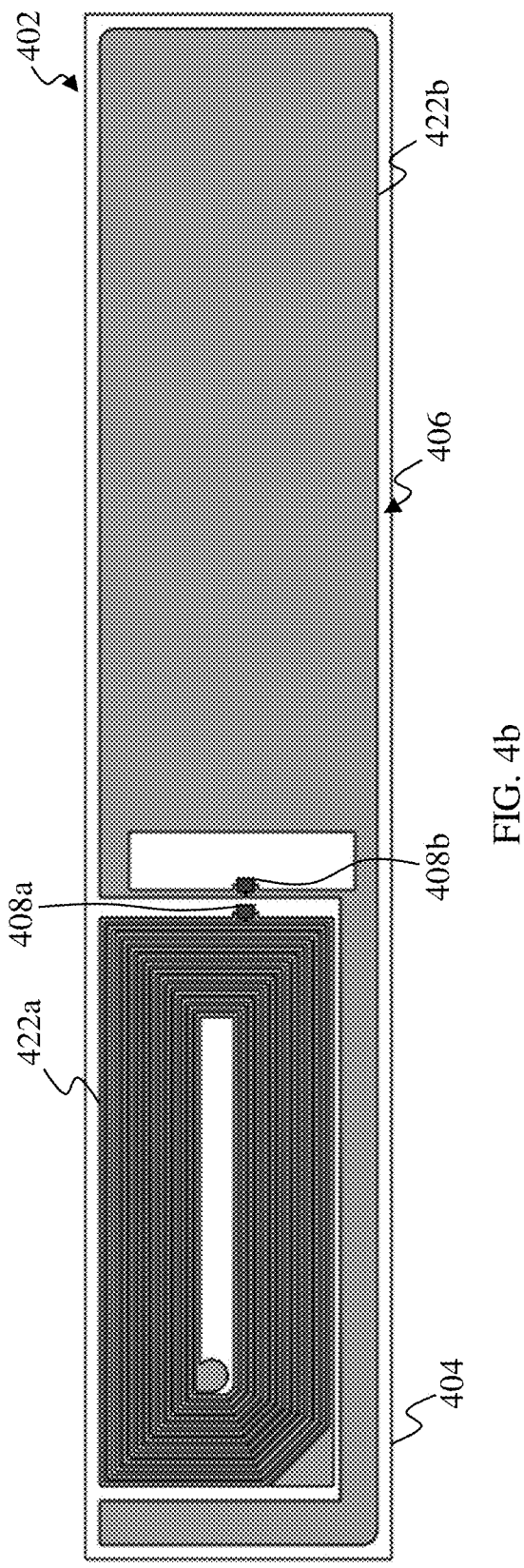
FIG. 4a
FIG. 4b

ON-METAL RFID TAG

CROSS-REFERENCE TO RELATED APPLICATION(S)

This application claims priority to U.S. Prov. Pat. Appl. No. 63/384,105, titled "On-Metal RFID Tag," filed Nov. 17, 2022, which is hereby incorporated by reference herein in its entirety.

TECHNICAL FIELD

The present disclosure generally relates to devices which manipulate electromagnetic (EM) radiation and more specifically relates to the field of coupling energy into identification devices such as radio frequency tags and labels. Embodiments of the present disclosure more specifically relate to near-field communication (NFC) or high frequency (HF) radio frequency tags and dual NFC or HF and ultra-high frequency (UHF) radio frequency tags and labels suitable for on-metal applications.

BACKGROUND

Electronic devices that can transmit a modulated EM signal that can be detected by an appropriate reader are widely used for the identification and tracking of items, particularly for articles in a shop or warehouse environment. Such devices, which may be referred to throughout this specification as EM tags, or simply as tags, generally comprise an integrated circuit (IC) chip coupled to an antenna which is tuned to a particular frequency of operation. The frequency of operation of current EM tags is generally radio frequencies (RF), but embodiments of the present disclosure are applicable to tags which operate at any frequency. Tags may be passive, in that they interact with incident radiation of the appropriate frequency and re-transmit a modulated signal back to a reader, or active in which the tag contains its own power source.

One commonly experienced disadvantage with such tags is that if directly placed on (or within several millimeters of) a metallic surface or metal asset, which is referred to herein as an "on-metal" application, their read range is decreased to unacceptable levels and, more typically, the tag cannot be read or interrogated by a reader. This is because a propagating-wave RF tag uses an antenna to receive the incident radiation. The antenna's dimensions and geometry dictate the frequency at which it resonates, and hence tailor the frequency of operation of the tag (typically 860-960 MHz for a UHF tag and 13.56 MHz for an NFC or HF tag). When the tag is placed near or in direct contact with a metallic surface, the tag's conductive antenna interacts with that surface, and hence its resonant properties are degraded or, more typically, negated. Therefore, the tracking of metal assets can be very difficult to achieve with RF tags. RF tags can also experience similar problems when applied to certain other surfaces which interact with RF electromagnetic waves, such as, certain types of glass and surfaces which possess significant water content, examples including certain types of wood with a high water or sap content. Problems can also be encountered when tagging materials which contain water such as, for example, water bottles, drink cans, or human bodies, etc.

Accordingly, there is a need in the art for EM tags, and particularly NFC or HF tags and dual NFC or HF and UHF tags, which mitigate at least some of the problems associated with conventional systems and are suitable for on-metal applications.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 3*a* and 3*b* are top plan views of NFC or HF tags according to the present disclosure;

FIGS. 4*a* and 4*b* are top plan views of dual NFC or HF and UHF tags according to the present disclosure;

DETAILED DESCRIPTION

The present disclosure generally relates to devices which manipulate EM radiation and more specifically relates to the field of coupling energy into identification devices such as RF tags and labels. Embodiments of the present disclosure more specifically relate to NFC or HF radio frequency tags and dual NFC or HF and UHF radio frequency tags and labels suitable for on-metal applications, as well as conventional applications to non-metal surfaces or assets, which are referred to herein as "off-metal" applications. However, embodiments of the present disclosure are applicable to tags which operate at any frequency or dual frequencies.

One object of the various embodiments of the present disclosure is to provide an NFC or HF tag or dual NFC or HF and UHF tag that functions on both metallic and non-metallic surfaces. Another object of the various embodiments of the present disclosure is for such tags to be suitable for RF labels, or simply labels, which can be printed and encoded using a conventional radio frequency identification (RFID) printer/encoder. Another object of the various embodiments of the present disclosure is to provide an NFC or HF tag or dual NFC or HF and UHF tag that is suitable for and functions on both metallic and non-metallic surfaces without requiring a layer containing costly ferrite or other RF absorbing material. The objectives and advantages of the various embodiments of the present disclosure are not limited to the foregoing, and other objectives and advantages will be apparent from the present disclosure.

Figure 1:
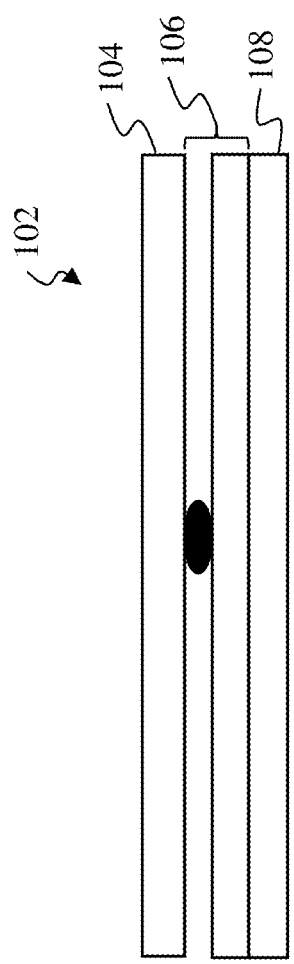
FIG. 1 illustrates a cross-sectional schematic diagram of an example NFC tag for on-metal applications.

Conventional NFC tags for on-metal applications generally fall into two main categories. A first category includes tags that contain a layer of ferrite material, which compensates for the issue of directly mounting the NFC coil on metal surfaces. FIG. 1 illustrates a cross-sectional schematic of a tag 102 in this first category. The tag 102 comprises a face stock 104, an antenna inlay 106 with IC chip beneath the face stock, and a layer of ferrite material 108 applied below the antenna inlay 106. The layer of ferrite material 108 typically varies between 0.1 to 1 mm thick, depending on the magnetic properties of the ferrite material. The thin layer of ferrite material 108 makes this category of on-metal NFC tags suitable for labels, which can be printed and encoded using a conventional RFID printer/encoder. However, ferrite sheets are relatively expensive, and so the layer of ferrite material 108 adds significant extra cost to the tag. Moreover, the thinner the layer of ferrite material 108, the more expensive and potentially cost-prohibitive the ferrite material is.

Figure 2:
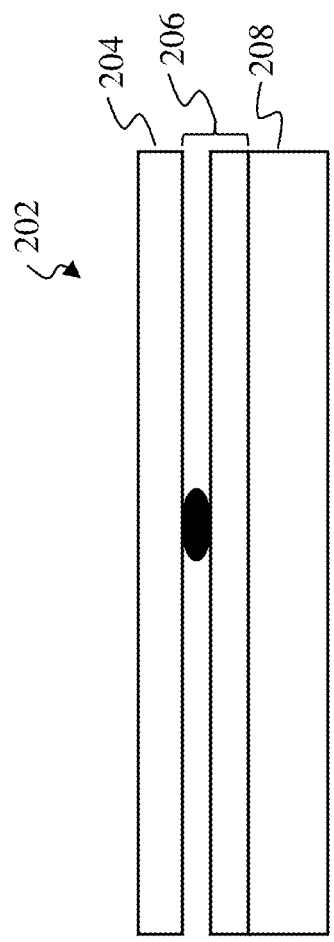
FIG. 2 illustrates a cross-sectional schematic diagram of another example NFC tag for on-metal applications.

A second category includes rigid tags that include an NFC coil mounted on a spacer to create a gap between the NFC coil and the metal asset. FIG. 2 illustrates a cross-sectional schematic of a tag 202 in this second category. The tag 202 comprises a face stock 204, an antenna inlay 206 with IC chip beneath the face stock, and a spacer or spacer layer 208 applied below the antenna inlay 206. The spacer or spacer layer 208 is generally a rigid material, such as plastic, ceramic, wood, or other dielectric material, and is typically greater than 2.0 mm thick, and thus, this category of on-metal NFC tags is not suitable for labels that can be printed and encoded using a conventional RFID printer/encoder. Moreover, a thick, rigid spacer 208, such as a plastic spacer layer, adds significant extra cost to the tag and makes it unsuitable for curved surfaces.

Figure 3C:
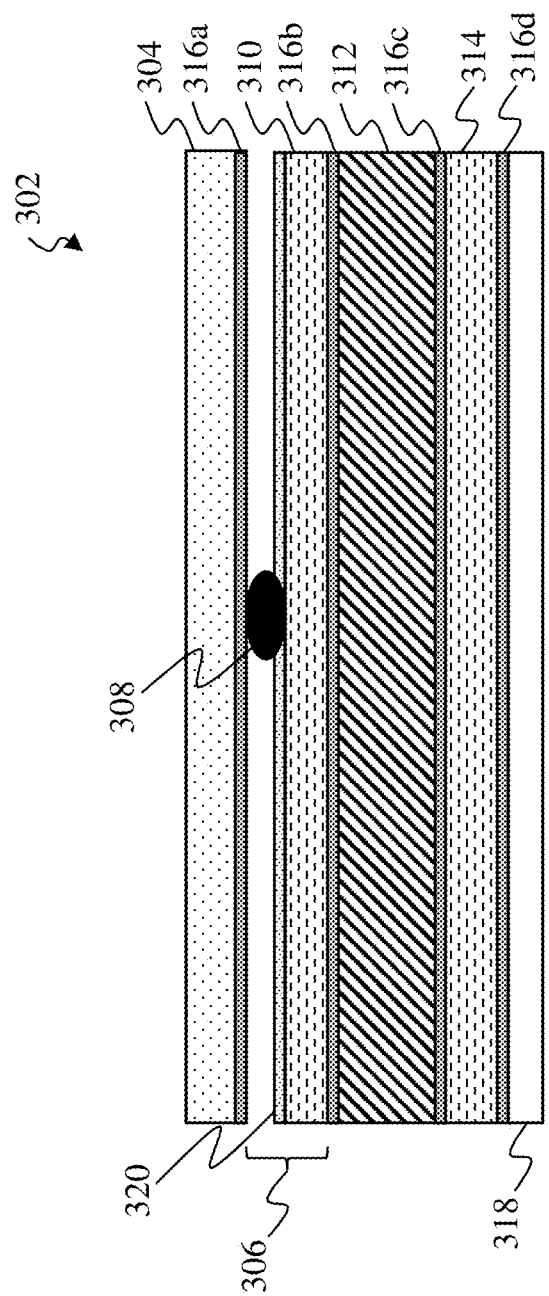
FIG. 3*c* is a cross-sectional schematic diagram of an NFC or HF tag according to the present disclosure.

FIGS. 3a-3c illustrate various embodiments of an NFC or HF tag according to the present disclosure. FIGS. 3a and 3b illustrate top plan views of tags according to the present disclosure, while FIG. 3c illustrates a cross-sectional schematic of a tag according to the present disclosure. The tag 302 comprises a face stock 304, as a forward-facing or top layer, and an antenna inlay 306, comprising an antenna (discussed further below) and an IC chip 308 on a substrate 310, beneath or applied to the face stock. The face stock 304 and substrate 310 each may be any suitable generally nonconductive material or combination of materials, including paper, glassine paper, and/or plastic, such as but not limited to polyamide or polyethylene terephthalate (PET). The face stock 304 and substrate 310 each may be any suitable thickness and be made of, or comprise, any suitable number of layers. In an example, the face stock 304 is between about 25 µm to 100 µm. In a further example, the face stock 304 is PET and is about 45 µm to 55 µm.

The IC chip 308 may be any suitable and/or commercially available IC chip. The antenna inlay 306 may comprise aluminum, copper, and/or any other suitable conductive material 320 on the substrate 310 and electrically or conductively connected with the IC chip 308. The IC chip 308 may be positioned at any suitable location in the antenna inlay 306, such as but not limited to, a central location as shown in FIG. 3a or an edge or near edge location as shown in FIG. 3b. The antenna inlay 306 may comprise an NFC or HF antenna coil designed for operating at 13.56 MHz formed in or by the conductive material 320. However, the antenna inlay 306 may comprise any RF or EM antenna. The antenna may be formed in or by the conductive material 320 using any process now known or yet to be developed. In an example, the antenna may be formed in the conductive material 320 using a subtractive manufacturing technique, such as chemical etching. In another example, the antenna may be formed by printing a conductive ink, comprising the conductive material 320, onto the substrate 310 in the desired antenna pattern. Although an example antenna design is illustrated in FIGS. 3a and 3b, any suitable or desired antenna design may be used and is not limited by the present disclosure.

The tag 302 comprises a flexible spacer layer 312 comprised of a suitable flexible nonconductive or dielectric material or combination of such materials beneath or applied to the antenna inlay 306. In examples, the spacer layer 312 may comprise an RF absorber, a foam, and/or a polymer, such as but not limited to polypropylene (PP). The spacer layer 312 may be any suitable thickness and may be made of, or comprise, any suitable number of layers of material or materials. In an example, the spacer layer 312 is less than 2 mm, and preferably is about 1 mm or less. In a further example, the spacer layer 312 comprises flexible PP and is about 1 mm thick.

The tag 302 comprises a ground plane layer 314 beneath or applied to the spacer layer 312. The ground plane layer 314 may comprise aluminum, copper, and/or any other suitable metallic material. The ground plane layer 314 may be any suitable thickness and may be made of, or comprise, any suitable number of layers. In an example, the ground plane layer 314 is between about 10 µm to 60 µm thick. In a further example, the ground plane layer 314 comprises aluminum and is about 50 µm thick.

One or more adhesive layers 316 may be provided between any of the tag layers or components. For example, an adhesive layer 316a may be provided between the face stock 304 and the antenna inlay 306, an adhesive layer 316b may be provided between the antenna inlay 306 and the spacer layer 312, and/or an adhesive layer 316c may be provided between the spacer layer 312 and ground plane layer 314. The tag 302 may further include an adhesive layer 316d beneath the ground plane layer and covered by a release layer 318 made of any suitable material, such as but not limited to, a paper or plastic/polymer. The release layer 318 is configured to be released or pulled away from the adhesive layer 316d to expose the adhesive layer 316d and permit the tag 302 to be adhesively attached to a surface. The adhesive layers 316 may have any suitable composition, and may comprise any commercially available adhesive. Additionally, any of the adhesive layers 316 can have the same composition or different compositions.

The total thickness of the tag 302 may be any suitable thickness. In an example, the total thickness of the tag 302, excluding the release layer 318, is less than or equal to about 1.3 mm. The tag 302 may be configured with any suitable length and width dimensions, as desired. In an example, the tag 302 may have a length of between about 30 mm and 50 mm and a width of about 20 mm and 30 mm. In a particular example, the tag 302 has a length of about 40 mm, a width of about 25 mm, and a thickness of less than 1.3 mm. The flexibility and thickness of the tag 302 make it suitable for a label, which can be printed and encoded using a conventional RFID printer/encoder, and also make it suitable for application to curved surfaces. The NFC or HF antenna (e.g., antenna inlay 306) is tuned to the appropriate operating frequency in consideration of the effect of the ground plane layer 314 or based on the proximity of the ground plane layer. The tag 302 is suitable for both on-metal applications and off-metal applications.

Figure 4C:
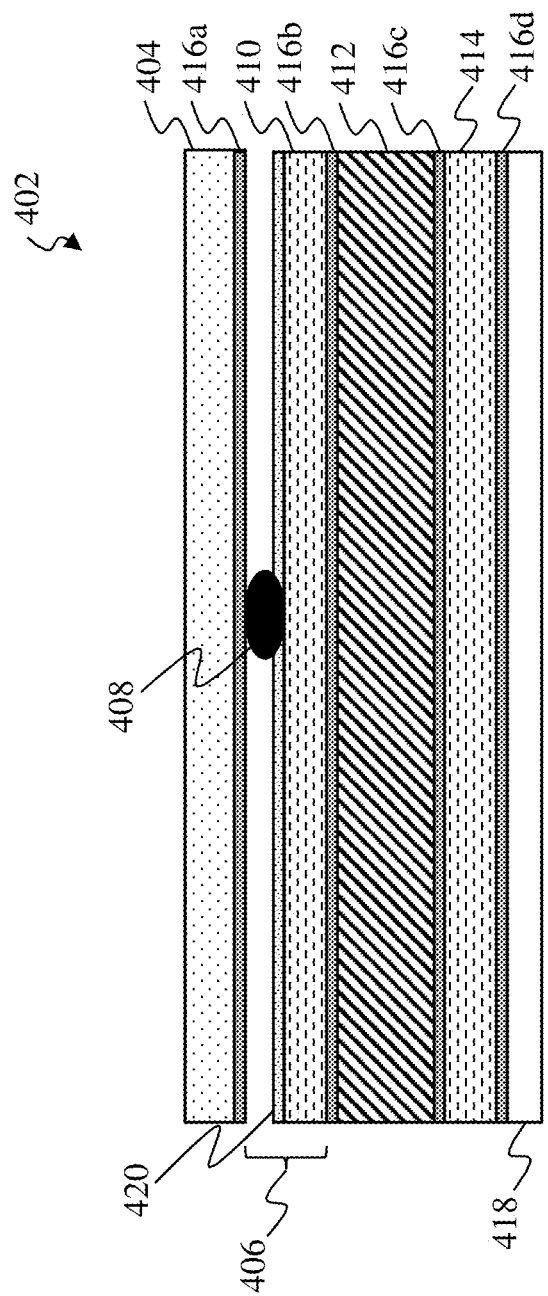
FIG. 4*c* is a cross-sectional schematic diagram of a dual NFC or HF and UHF tag according to the present disclosure.

FIGS. 4a-4c illustrate various embodiments of a dual functionality or dual antenna tag according to the present disclosure. In an example embodiment, the dual antennas include an NFC or HF antenna operating at 13.56 MHz and a UHF antenna operating in the range of 860-960 MHz. However, embodiments of the present disclosure may utilize any suitable antennas or antenna combination and are not limited to the dual functionality of NFC/HF and UHF.

FIGS. 4a and 4b illustrate top plan views of dual antenna tags according to the present disclosure, while FIG. 4c illustrates a cross-sectional schematic of a dual antenna tag according to the present disclosure. Similar to the tag 302, the tag 402 comprises a face stock 404, as a forward-facing or top layer, and an antenna inlay 406, comprising dual antennas (discussed further below) and one or more IC chips 408 a substrate 410, beneath or applied to the face stock. The face stock 404 and substrate 410 each may be any suitable generally nonconductive material or combination of materials, including paper, glassine paper, and/or plastic, such as but not limited to polyamide or polyethylene terephthalate (PET). The face stock 404 and substrate 410 each may be any suitable thickness and be made of, or comprise, any suitable number of layers. In an example, the face stock 404 is between about 25 μm to 100 μm. In a further example, the face stock 404 is PET and is about 45 μm to 55 μm.

The antenna inlay 406 may comprise aluminum, copper, and/or any other suitable conductive material 420 on the substrate 410 and electrically or conductively connected with the one or more IC chips 408. The antenna inlay 406 may include dual antennas 422a and 422b arranged in any suitable configuration. In an example, the antenna inlay 406 may comprise an NFC or HF antenna coil 422a designed for operating at 13.56 MHz and a UHF antenna 422b designed for operating in the range of 860-960 MHz, each formed in or by the conductive material 420. The UHF antenna 422b may be, for example, a monopole antenna, dipole antenna, or loop antenna. In another example, the UHF antenna 422b may, in conjunction with the ground plane (discussed below), form a folded antenna, when portions of the UHF antenna are conductively or ohmically connected or capacitively coupled with the ground plane. However, the antenna inlay 406 may comprise any RF or EM antennas or antenna combination. The dual antennas each may be formed in or by the conductive material 420 using any process now known or yet to be developed. In an example, either antenna or both antennas may be formed in the conductive material 420 using a subtractive manufacturing technique, such as chemical etching. In another example, either antenna or both antennas may be formed by printing a conductive ink, comprising the conductive material 420, onto the substrate 410 in the desired antenna pattern. Although example antenna designs are illustrated in FIGS. 4a and 4b, any suitable or desired antenna designs may be used and are not limited by the present disclosure.

In an example, illustrated in FIG. 4a, the dual antennas 422a and 422b may share and be electrically and operably connected with a single IC chip 408. The IC chip 408 may be positioned at any suitable location in the tag relative the antenna inlay 406, such as but not limited to, a generally central location between the dual antennas 422a and 422b, as shown in FIG. 4a. In another example, illustrated in FIG. 4b, two IC chips 408a and 408b may be provided, and each of the dual antennas 422a and 422b may be electrically and operably connected with a respective one of the IC chips. Each of the IC chips 408a and 408b may be positioned at any suitable location in the tag relative its corresponding antenna 422a or 422b. The one or more IC chips 408 may each be any suitable and/or commercially available IC chip.

The tag 402 comprises a flexible spacer layer 412 of a suitable flexible nonconductive or dielectric material or combination of such materials beneath or applied to the antenna inlay 406. In examples, the spacer layer 412 may comprise an RF absorber, a foam, and/or a polymer, such as but not limited to PP. The spacer layer 412 may be any suitable thickness and be made of, or comprise, any suitable number of layers of material or materials. In an example, the spacer layer 412 is less than 2 mm, and preferably is about 1 mm or less. In a further example, the spacer layer 412 comprises flexible PP and is about 1 mm thick.

The tag 402 comprises a ground plane layer 414 beneath or applied to the spacer layer 412. The ground plane layer 414 may comprise aluminum, copper, and/or any other suitable metallic material. The ground plane layer 414 may be any suitable thickness and be made of, or comprise, any suitable number of layers. In an example, the ground plane layer 414 is between about 10 μm to 60 μm thick. In a further example, the ground plane layer 414 comprises aluminum and is about 50 μm thick.

One or more adhesive layers 416 may be provided between any of the tag layers or components. For example, an adhesive layer 416a may be provided between the face stock 404 and the antenna inlay 406, an adhesive layer 416b may be provided between the antenna inlay 408 and the spacer layer 412, and/or an adhesive layer 416c may be provided between the spacer layer 412 and ground plane layer 414. The tag 402 may further include an adhesive layer 416d beneath the ground plane layer and covered by a release layer 418 made of any suitable material, such as but not limited to, a paper or plastic/polymer. The release layer 418 is configured to be released or pulled away from the adhesive layer 416d to expose the adhesive layer 416d and permit the tag 402 to be adhesively attached to a surface. The adhesive layers 416 may have any suitable composition, and may comprise any commercially available adhesive. Additionally, any of the adhesive layers 416 can have the same composition or different compositions.

The total thickness of the tag 402 may be any suitable thickness. In an example, the total thickness of the tag 402, excluding the release layer 418, is less than or equal to about 1.3 mm. The tag 402 may be configured with any suitable length and width dimensions, as desired. In an example, the tag 402 may have a length of between about 70 mm and 130 mm, preferably between about 90 mm and 110 mm, and a width of about 10 mm and 30 mm, preferably between about 15 mm and 25 mm. In a particular example, the tag 402 has a length of about 104 mm, a width of about 20 mm, and a thickness of less than 1.3 mm. The flexibility and thickness of the tag 402 make it suitable for a label, which can be printed and encoded using a conventional RFID printer/encoder, and also make it suitable for application to curved surfaces. The NFC or HF antenna and UHF antenna (e.g., antenna inlay 406) are tuned to the appropriate operating frequencies in consideration of the effect of the ground plane layer 414 or based on the proximity of the ground plane layer. The tag 402 is suitable for both on-metal applications and off-metal applications.

Figure 5:
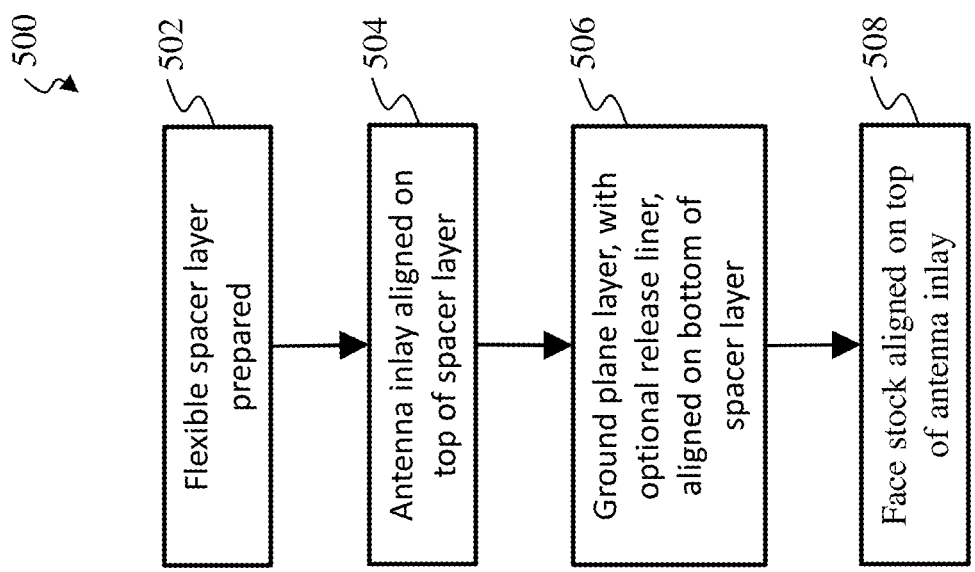
FIG. 5 is a flow diagram for an example method for making an NFC or HF tag or dual NFC or HF and UHF tag.

FIG. 5 illustrates a method for making a tag of the present disclosure, such as tag 302 or tag 402. Step 502 includes preparing the flexible spacer layer 312/412. In an example, the flexible spacer layer may be formed from a single layer of an RF absorber, foam, or polymer, such as but not limited to PP, of suitable or desired thickness. In another example, the flexible spacer layer may be formed from multiple layers of material, such as but not limited to multiple layers of PP, to create the desired overall thickness of the spacer layer. Step 504 includes aligning or positioning the antenna inlay 306/406 on top of the spacer layer and setting it in place with adhesive (e.g., adhesive layer 316b/416b). Step 506 includes aligning or positioning the ground plane layer 314/414, with optional release liner 318/418 adhesively applied thereto, on the bottom of the spacer layer and setting it in place with adhesive (e.g., adhesive layer 316c/416c). Step 508 includes aligning or positioning the face stock 304/404 on top of the antenna inlay and setting in place with adhesive (e.g., adhesive layer 316a/416a).

Although the flowchart of FIG. 5 illustrates an example method as comprising sequential steps or processes as having a particular order of operations, many of the steps or operations in the flowchart can be performed in parallel or concurrently, and the flowchart should be read in the context of the various embodiments of the present disclosure. The order of the method steps or process operations illustrated in FIG. 5 may be rearranged for some embodiments. Similarly, the method illustrated in FIG. 5 could have additional steps or operations not included therein or fewer steps or operations than those shown. At a broader level, the method of FIG. 5 should be understood as generally: providing a face stock (e.g., face stock 304/404) on top of an antenna inlay (e.g., antenna inlay 306/406), which is in turn provided on top of a flexible spacer layer (e.g., spacer layer 312/412), which is in turn provided on top of a ground plane layer (e.g., ground plane layer 314/414), which may optionally be provided on top of a release liner (318/418). Moreover, the layers may be operably connected with one another using adhesives or adhesive layers (e.g., adhesive layers 316/416).

As will be appreciated, an advantage of the various embodiments of the present disclosure is that the above-described NFC or HF tags or dual NFC or HF and UHF tags are suitable for and function on both metallic surfaces (on-metal applications) and non-metallic surfaces (off-metal applications). Another advantage is that such NFC or HF tags or dual NFC or HF and UHF tags are suitable for on-metal applications without requiring a layer containing costly ferrite material. Yet another advantage is that such NFC or HF tags or dual NFC or HF and UHF tags are suitable for labels, which can be printed and encoded using a conventional RFID printer/encoder. The advantages of the various embodiments of the present disclosure are not limited to the foregoing, and other advantages will be apparent from the present disclosure.

ADDITIONAL EXAMPLES

Example 1 includes subject matter relating to a radio frequency identification (RFID) tag comprising: a face stock layer; an antenna inlay beneath the face stock layer and comprising a radio frequency (RF) antenna and an integrated circuit (IC) chip; a spacer layer beneath the antenna inlay; and a metal ground plane.

In Example 2, the subject matter of Example 1 optionally includes wherein the antenna inlay comprises a conductive material on a polyethylene terephthalate substrate.

In Example 3, the subject matter of Example 1 or 2 optionally includes wherein the antenna inlay is configured to operate at 13.56 MHz.

In Example 4, the subject matter of any of Examples 1 to 3 optionally includes wherein the spacer layer is comprised of a flexible material.

In Example 5, the subject matter of any of Examples 1 to 4 optionally includes wherein the spacer layer comprises polypropylene.

In Example 6, the subject matter of any of Examples 1 to 5 optionally includes wherein the spacer layer comprises multiple layers of polypropylene.

In Example 7, the subject matter of any of Examples 1 to 6 optionally includes wherein the metal ground plane is aluminum.

In Example 8, the subject matter of any of Examples 1 to 7 optionally includes an adhesive layer beneath the metal ground plane and a release layer beneath the adhesive layer, the release layer configured to be pulled away from the adhesive layer to expose the adhesive layer and permit the RFID tag to be adhesively attached to a surface.

In Example 9, the subject matter of any of Examples 1 to 8 optionally includes wherein the face stock layer comprises polyethylene terephthalate.

In Example 10, the subject matter of any of Examples 1 to 9 optionally includes wherein the thickness of the RFID tag is less than or equal to 1.3 mm.

Example 11 includes subject matter relating to a dual frequency antenna tag comprising: a face stock layer; an antenna inlay beneath the face stock layer and comprising a first radio frequency (RF) antenna, a second RF antenna, and at least one integrated circuit (IC) chip; a spacer layer beneath the antenna inlay; and a metal ground plane.

In Example 12, the subject matter of Example 11 optionally includes wherein the antenna inlay comprises a conductive material on a polyethylene terephthalate substrate.

In Example 13, the subject matter of Example 11 or 12 optionally includes wherein the first RF antenna is configured to operate at 13.56 MHz and the second RF antenna is configured to operate in the range of 860-960 MHz.

In Example 14, the subject matter of any of Examples 11 to 13 optionally includes two IC chips, a first one of the IC chips electrically connected with the first RF antenna and a second one of the IC chips electrically connected with the second RF antenna.

In Example 15, the subject matter of any of Examples 11 to 14 optionally includes wherein the second RF antenna is ohmically connected or capacitively coupled with the metal ground plane to form a folded antenna.

In Example 16, the subject matter of any of Examples 11 to 15 optionally includes wherein the spacer layer is comprised of a flexible material.

In Example 17, the subject matter of any of Examples 11 to 16 optionally includes wherein the spacer layer comprises polypropylene.

In Example 18, the subject matter of any of Examples 11 to 17 optionally includes wherein the spacer layer comprises multiple layers of polypropylene.

In Example 19, the subject matter of any of Examples 11 to 18 optionally includes wherein the metal ground plane is aluminum.

In Example 20, the subject matter of any of Examples 11 to 19 optionally includes an adhesive layer beneath the metal ground plane and a release layer beneath the adhesive layer, the release layer configured to be pulled away from the adhesive layer to expose the adhesive layer and permit the RFID tag to be adhesively attached to a surface.

In Example 21, the subject matter of any of Examples 11 to 20 optionally includes wherein the face stock layer comprises polyethylene terephthalate.

In Example 22, the subject matter of any of Examples 11 to 21 optionally includes wherein the thickness of the RFID tag is less than or equal to 1.3 mm.

Additional Notes

The above detailed description includes references to the accompanying drawings, which form a part of the detailed description. The drawings show, by way of illustration, specific embodiments that can be practiced. These embodiments may also be referred to herein as "examples." Such embodiments or examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. That is, the above-described embodiments or examples or one or more aspects, features, or elements thereof can be used in combination with each other.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A radio frequency identification (RFID) tag comprising:
   a face stock layer comprising polyethylene terephthalate (PET) and having a top surface configured for printing thereto;
   an antenna inlay beneath the face stock layer on a side opposite the top surface and comprising a radio frequency (RF) antenna and an integrated circuit (IC) chip;
   a spacer layer beneath the antenna inlay, wherein the spacer layer comprises multiple flexible layers of polypropylene; and
   a metal ground plane.

2. The RFID tag of claim 1, wherein the antenna inlay comprises a conductive material on a polyethylene terephthalate substrate.

3. The RFID tag of claim 1, wherein the antenna inlay is configured to operate at 13.56 MHz.

4. The RFID tag of claim 1, wherein the metal ground plane is aluminum.

5. The RFID tag of claim 1, further comprising an adhesive layer beneath the metal ground plane and a release layer beneath the adhesive layer, the release layer configured to be pulled away from the adhesive layer to expose the adhesive layer and permit the RFID tag to be adhesively attached to a surface.

6. A radio frequency identification (RFID) tag comprising:
   a face stock layer;
   an antenna inlay beneath the face stock layer on a side opposite the top surface and comprising a radio frequency (RF) antenna and an integrated circuit (IC) chip;
   a spacer layer beneath the antenna inlay, wherein the spacer layer comprises multiple flexible layers of polypropylene; and
   a metal ground plane;
   wherein a thickness of the RFID tag is less than or equal to 1.3 mm.

7. The RFID tag of claim 6, wherein:
   a thickness of the face stock layer is between 25 μm to 100 μm, inclusive;
   a thickness of the spacer layer is less than or equal to 1 mm; and
   a thickness of the ground plane is between 10 μm to 60 μm, inclusive.

8. A dual frequency antenna tag comprising:
   a face stock layer;
   an antenna inlay beneath the face stock layer and comprising a first radio frequency (RF) antenna configured to operate at 13.56 MHz, a second RF antenna configured to operate in the range of 860-960 MHZ, and at least one integrated circuit (IC) chip;
   a spacer layer beneath the antenna inlay, wherein the spacer layer comprises multiple flexible layers of polypropylene; and
   a metal ground plane.

9. The antenna tag of claim 8, wherein the antenna inlay comprises a conductive material on a polyethylene terephthalate substrate.

10. The antenna tag of claim 8, comprising two IC chips, a first one of the IC chips electrically connected with the first RF antenna and a second one of the IC chips electrically connected with the second RF antenna.

11. The antenna tag of claim 8, wherein the second RF antenna is ohmically connected or capacitively coupled with the metal ground plane to form a folded antenna.

12. The antenna tag of claim 8, wherein the metal ground plane is aluminum.

13. The antenna tag of claim 8, further comprising an adhesive layer beneath the metal ground plane and a release layer beneath the adhesive layer, the release layer configured to be pulled away from the adhesive layer to expose the adhesive layer and permit the RFID tag to be adhesively attached to a surface.

14. The antenna tag of claim 8, wherein the face stock layer comprises polyethylene terephthalate.

15. The antenna tag of claim 8, wherein a thickness of the RFID tag is less than or equal to 1.3 mm.

16. The antenna tag of claim 15, wherein:
   a thickness of the face stock layer is between 25 μm to 100 μm, inclusive;
   a thickness of the spacer layer is less than or equal to 1 mm; and
   a thickness of the ground plane is between 10 μm to 60 μm, inclusive.

* * * * *